J. W. SHAW.
MOTOR TRUCK ATTACHMENT.
APPLICATION FILED MAY 24, 1917.
1,284,794.
Patented Nov. 12, 1918.
3 SHEETS—SHEET 2.
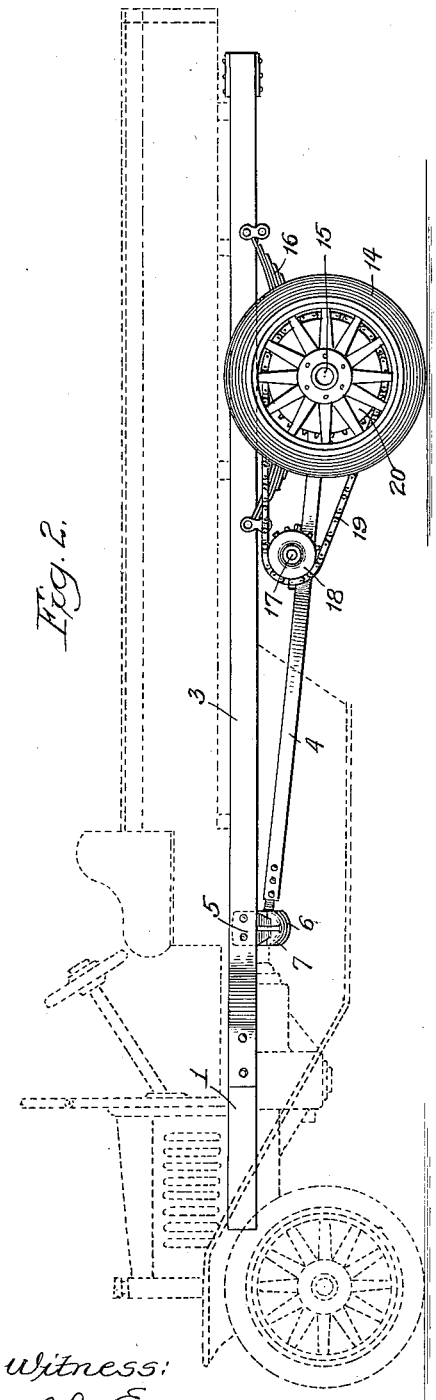
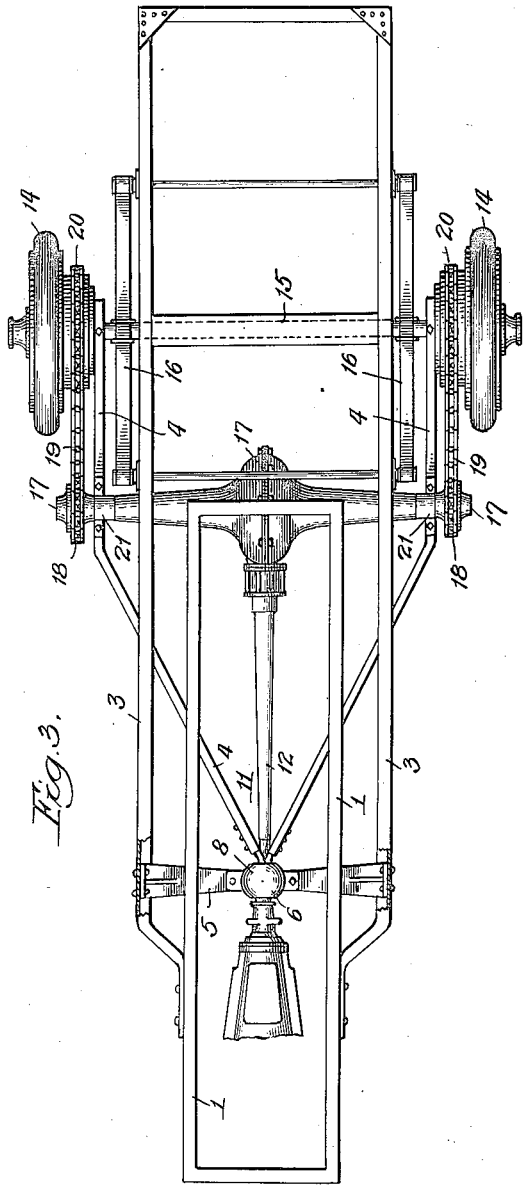
Witness:
John Enders
Inventor:
James W. Shaw,
by Robert Burns,
Atty.

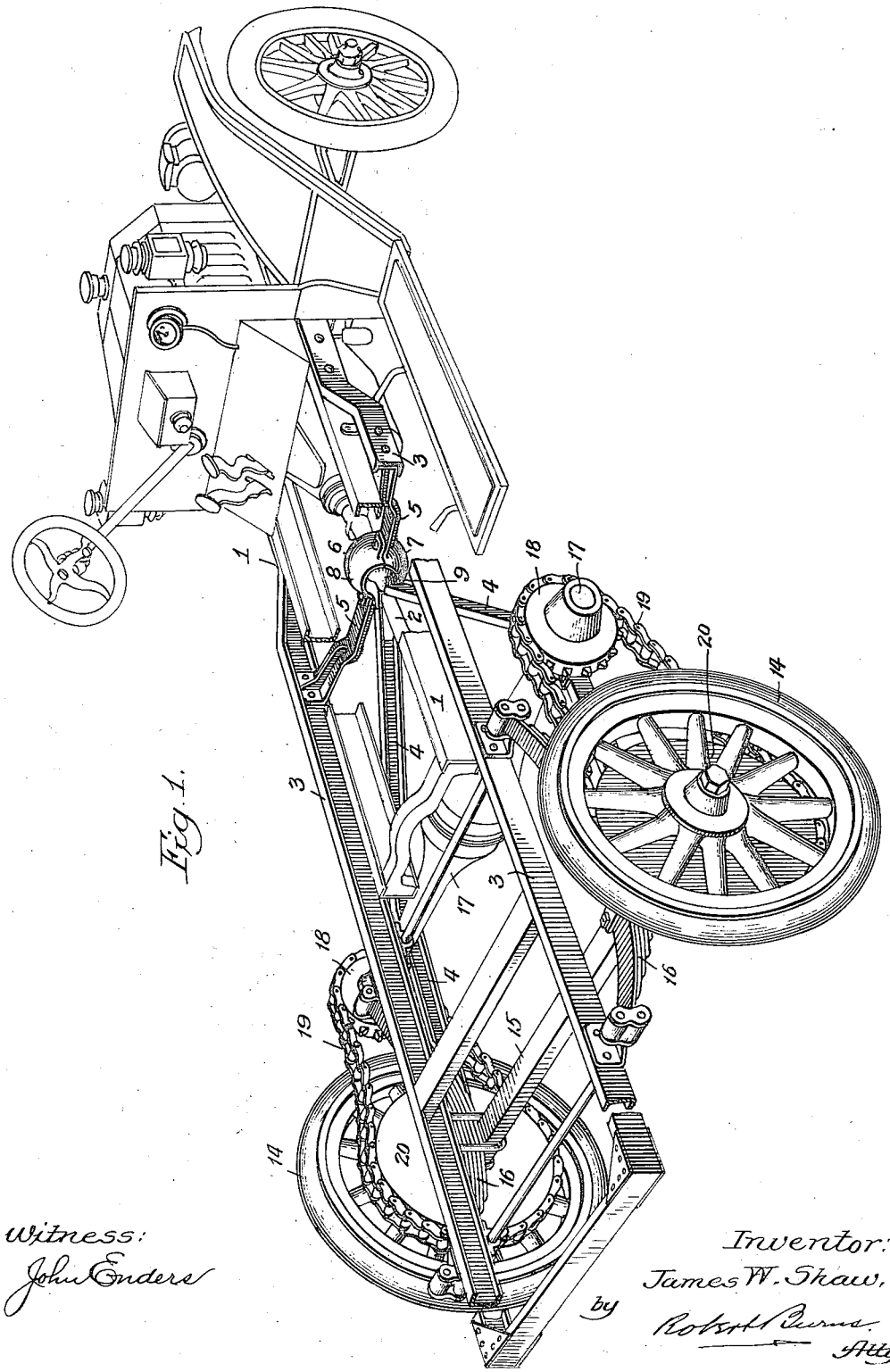

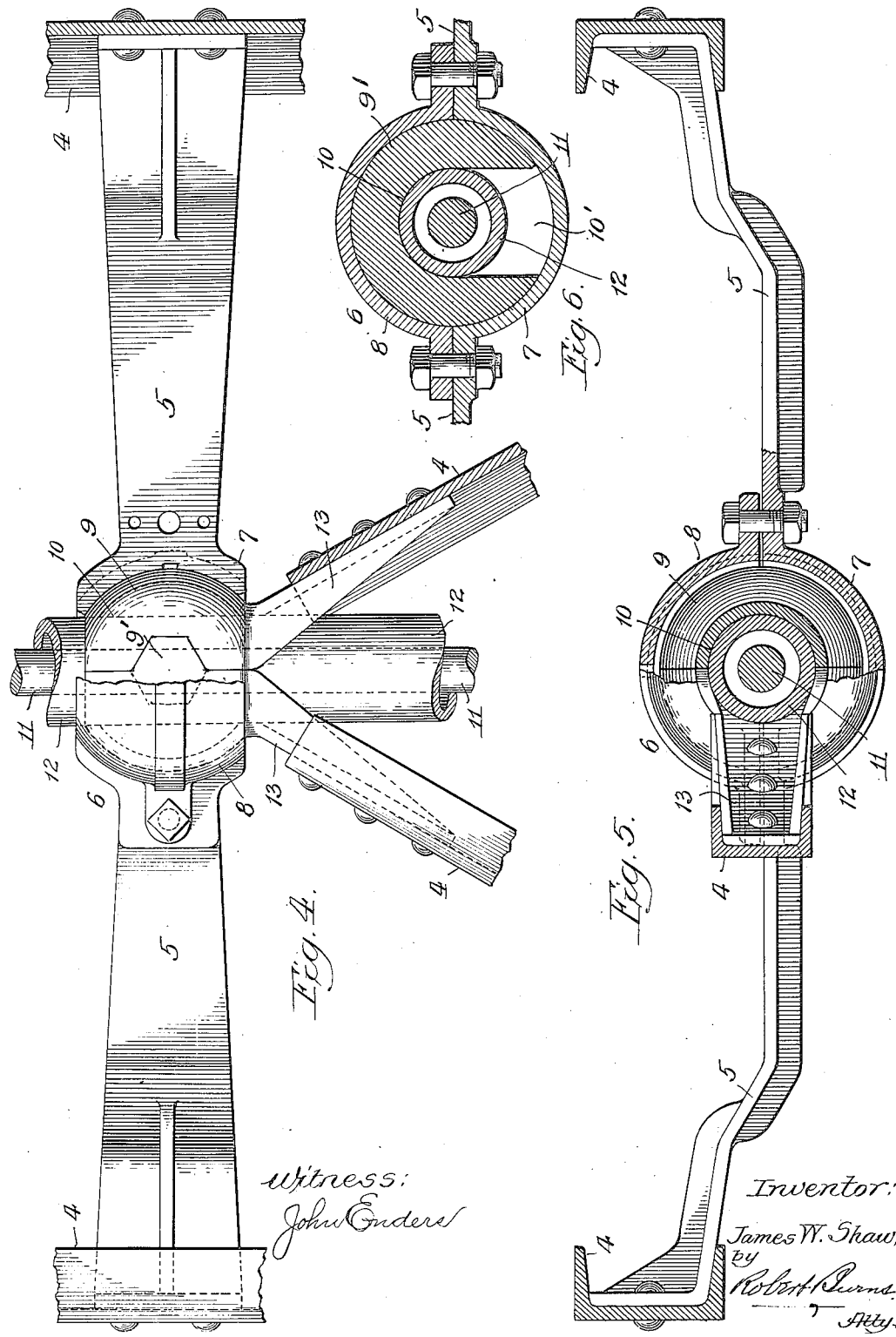

UNITED STATES PATENT OFFICE.

JAMES W. SHAW, OF CHICAGO, ILLINOIS.

MOTOR-TRUCK ATTACHMENT.

1,284,794. Specification of Letters Patent. Patented Nov. 12, 1918.

Application filed May 24, 1917. Serial No. 170,714.

*To all whom it may concern:*

Be it known that I, JAMES W. SHAW, a citizen of the United States of America, and a resident of Chicago, in the county of Cook, State of Illinois, have invented certain new and useful Improvements in Motor-Truck Attachments, of which the following is a specification.

This invention relates to the type of automobile attachments which forms the subject matter of my prior application for Letters Patent, Serial No. 124,974, filed October 11, 1916, and which are adapted to convert an ordinary passenger carrying automobile into a freight carrying truck.

And the present improvement has for its object to provide a simple and efficient structural formation and combination of parts, whereby lateral flexibility is imparted to reorganized structure, and with which a convenient and ready assemblage of the parts can be effected; all as will hereinafter more fully appear.

In the accompanying drawings:

Figure 1, is a perspective view illustrating the general arrangement of parts in the present improvement.

Fig. 2, is a side elevation of the same.

Fig. 3, is a top view of the truck frame and accessories.

Fig. 4, is an enlarged detail top view with parts removed and in section, of the universal connection of the vibratory frame of the present improvement.

Fig. 5, is an enlarged detail rear elevation partly in section of the structure shown in Fig. 4.

Fig. 6, is an enlarged detail rear elevation with parts in section of a modification.

Similar reference numerals indicate like parts in the several views.

In the drawings, 1 designates the usual supporting frame or chassis of a passenger carrying automobile, upon which is mounted the forward portion of a vehicle body, motor and other usual accessories, the main or power shaft 2 of the motor having the usual central longitudinal arrangement.

3, designates an auxiliary frame, constituting a rearward extension of the frame or chasis 1 aforesaid, and fixedly secured thereto by rivets or other usual connecting means to constitute the support for the rear portion of a freight carrying truck body of any ordinary form.

4 designates a vibratory frame located beneath the frames 1, 2, aforesaid, and which in the present improvement is pivotally attached at its forward end to a transverse rail or member 5 of the auxiliary frame 3 aforesaid, by a centrally arranged universal joint 6, preferably of the spherical type shown, and which in the preferred construction shown in Figs. 1 to 5, inclusive, comprises as follows:

7 designates a semi-spherical central formation of the transverse rail 5 aforesaid, and which in connection with a removable cap member 8, of a corresponding semi-spherical formation, constitutes the outer and fixed member of the universal joint 6 aforesaid.

9 designates a spherical head constituting the inner and movable member of the universal joint 6 aforesaid. In the present improvement the head 9 is formed with a diametric opening or passage 10, adapted to receive an adjacent part of the longitudinal drive or motor shaft 11 and inclosing casing 12 thereof, of the vehicle. Said head 9 is also provided with rear extensions 13 of a horizontally expanded or inclined shape, for the rigid attachment of the inclined forward ends of the vibratory frame 4 aforesaid.

To effect a ready and convenient assemblage of the parts of the universal joint 6, around the longitudinal drive shaft 11 and its inclosing housing 12, the inner and movable head 9 of said joint is, in the preferred construction shown in Figs. 4 and 5, made in two halves or parts, with a corresponding separation of the frame attaching extension 13, and the said halves or parts are preferably held from independent longitudinal movement in relation to each other by inter-engaging lugs and recesses 9' at the meeting edges of the parts as shown in Fig. 4.

With such formation, and with the aforesaid cap member 8 removed, the respective parts of the spherical head 9 can be introduced sidewise into place, around the longitudinal drive shaft 11 and housing 12, and securely held in proper position by a subsequent application of the cap member 8 aforesaid.

While the preferred form of the present invention as illustrated in Figs. 1, 4 and 5, involves the formation of the spherical head 9 in two separable halves as heretofore described, it is within the scope of the present invention to make said spherical head in one piece as illustrated in Fig. 6, and in such modified structure the spherical head 9' will have an open bottom longitudinal passage 10' adapted for downward application over the longitudinal drive shaft 11, and its inclosing housing 12, as illustrated in Fig. 6.

At its rear end the vibratory frame 4 aforesaid, is connected to the driving axle of the reconstructed vehicle, and preferably in the manner set forth in my former application, as follows:

14 designates the rear driving wheels mounted on the usual non-revoluble axle 15, which in turn is resiliently connected to a rear portion of the auxiliary frame 3 by springs 16 and other usual connecting means.

17 designates a transversely arranged driving shaft, of the ordinary differential type, and having operative connection at its middle with the power shaft 2 aforesaid, while its respective ends are provided with sprocket pinions 18, which in turn have chain connections 19 with sprocket wheels 20 fixedly associated with the rear driving wheels 14 aforesaid. As in my former construction a material part of the present invention comprises the mounting of the said intermediate differential driving shaft 17 in journal boxes 21 fixed to the vibratory frame 4 aforesaid, so as to maintain a fixed relation between the shaft 17 and driving wheels 14 and thus prevent the chains 19 becoming detached from the sprocket pinions and gears in actual use.

Having thus fully described my said invention, what I claim as new and desire to secure by Letters Patent, is:—

1. In a motor truck attachment of the type herein described, the combination of a main frame, an axle resiliently associated with said main frame, driving wheels mounted on said axle, a vibratory frame pivotally connected at its forward end to a fixed transverse portion of the main frame by a single centrally disposed universal joint, comprising a fixed outer sectional member and a movable inner member connected to the forward end of the aforesaid vibratory frame and provided with a longitudinal passage for the longitudinal drive shaft of the vehicle, the rear end of said vibratory frame being attached to the axle aforesaid, and a differential drive shaft mounted on said vibratory frame and having chain and sprocket wheel connections with the driving wheels aforesaid, and operative connection with the longitudinal drive shaft of the vehicle, substantially as set forth.

2. In a motor truck attachment of the type herein described, the combination of a main frame, an axle resiliently associated with said main frame, driving wheels mounted on said axle, a vibratory frame pivotally connected at its forward end to a fixed transverse portion of the main frame by a single centrally disposed universal joint, comprising a fixed outer sectional member and a movable inner member connected to the forward end of the aforesaid vibratory frame, said inner member being formed in halves and provided with a longitudinal passage for the longitudinal drive shaft of the vehicle, the rear end of said vibratory frame being attached to the axle aforesaid, and a differential drive shaft mounted on said vibratory frame and having chain and sprocket wheel connections with the driving wheels aforesaid, and operative connection with the longitudinal drive shaft of the vehicle, substantially as set forth.

3. In a motor truck attachment of the type herein described, the combination of a main frame, an axle resiliently associated with said main frame, driving wheels mounted on said axle, a vibratory frame pivotally connected at its forward end to a fixed transverse portion of the main frame by a single centrally disposed universal joint, comprising a fixed outer sectional member and a movable inner member connected to the forward end of the aforesaid vibratory frame, said inner member being formed in halves and provided with a longitudinal passage for the longitudinal drive shaft of the vehicle and with inter-engaging lugs and recesses at the meeting edges of said halves, the rear end of said vibratory frame being attached to the axle aforesaid, and a differential drive shaft mounted on said vibratory frame and having chain and sprocket wheel connections with the driving wheels aforesaid, and operative connection with the longitudinal drive shaft of the vehicle, substantially as set forth.

Signed at Chicago, Illinois, this 22nd day of May, 1917.

JAMES W. SHAW.